United States Patent [19]

Schmidt et al.

[11] Patent Number: 5,601,773
[45] Date of Patent: Feb. 11, 1997

[54] CO-INJECTION MACHINE

[75] Inventors: Gerhard G. Schmidt, Cincinnati; Mark Elsass, Batavia, both of Ohio

[73] Assignee: Cincinnati Milacron Inc., Cincinnati, Ohio

[21] Appl. No.: 439,925

[22] Filed: May 12, 1995

[51] Int. Cl.$^6$ ................................................ B29C 45/22
[52] U.S. Cl. ............... 264/328.8; 264/40.1; 264/255; 425/129.1; 425/130; 425/569
[58] Field of Search ............... 425/129.1, 569, 425/570, 573, 582, 583, 130; 264/328.8, 40.1, 255

[56] References Cited

U.S. PATENT DOCUMENTS

| | | | |
|---|---|---|---|
| 3,162,900 | 12/1964 | Huelskamp | 18/30 |
| 3,481,001 | 12/1969 | Stillhard | 18/30 |
| 3,751,203 | 8/1973 | Hehl | 425/190 |
| 3,797,808 | 3/1974 | Ma et al. | 259/191 |
| 3,836,301 | 9/1974 | Hehl | 425/192 |
| 3,909,173 | 9/1975 | Latter | 425/192 |
| 4,005,961 | 2/1977 | Manceau | 425/190 |
| 4,242,362 | 1/1981 | Rees | 425/130 |
| 4,315,724 | 2/1982 | Taoka et al. | 425/130 |
| 4,334,847 | 6/1982 | Schauffele | 425/227 |
| 4,416,602 | 11/1983 | Neumeister | 425/130 |
| 4,470,936 | 9/1984 | Potter | 264/39 |
| 4,643,659 | 2/1987 | Paul | 425/131.1 |
| 4,657,496 | 4/1987 | Ozeki et al. | 425/130 |
| 4,701,292 | 10/1987 | Valyi | 264/328.8 |
| 4,715,802 | 12/1987 | Arai | 425/130 |
| 4,717,324 | 1/1988 | Schad et al. | 425/130 |
| 4,808,101 | 2/1989 | Schad et al. | 425/130 |
| 4,863,665 | 9/1989 | Schad et al. | 264/255 |
| 4,907,960 | 3/1990 | Hertzer | 425/593 |
| 4,931,234 | 6/1990 | Schad et al. | 264/40.1 |
| 4,994,220 | 2/1991 | Gutjahr et al. | 264/69 |
| 5,040,963 | 8/1991 | Beck et al. | 425/130 |
| 5,074,772 | 12/1991 | Gutjahr | 425/130 |
| 5,076,777 | 12/1991 | Schmitt | 425/133.5 |
| 5,145,630 | 9/1992 | Schad | 264/328.8 |
| 5,183,621 | 2/1993 | Yukihiro et al. | 264/297.2 |
| 5,186,954 | 2/1993 | Miyahara et al. | 425/130 |
| 5,378,139 | 1/1995 | Schad et al. | 425/549 |

FOREIGN PATENT DOCUMENTS

| 213370 | 9/1984 | Germany . |
|---|---|---|
| 213388 | 9/1984 | Germany . |

OTHER PUBLICATIONS

Cincinnati Milacron brochure: "CAMAC 486 Plus— Controls for Injection Molding Machines", Published Jun. 1994.
Cincinnati Milacron brochure: "VL725 Co-injection", Published Jun. 1994.

*Primary Examiner*—Harold Pyon
*Attorney, Agent, or Firm*—Stephen H. Friskney

[57] ABSTRACT

A pair of injection units and a common co-injection manifold are carried on a slide mounted a machine base. The machine base carries a mold element, and the injection units and manifold are moved in unison with respect to the mold element. The injection units are, in turn, carried on slideways mounted to the machine slide such that the injection units may be separately moved relative to the co-injection manifold.

29 Claims, 5 Drawing Sheets

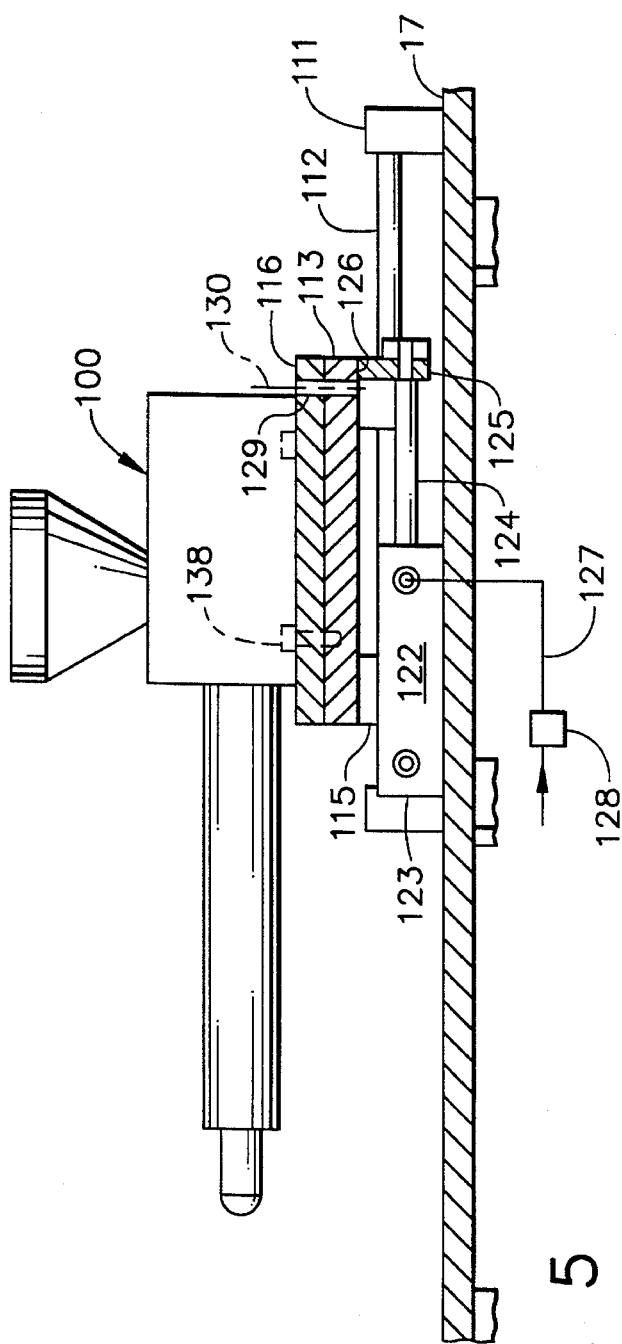
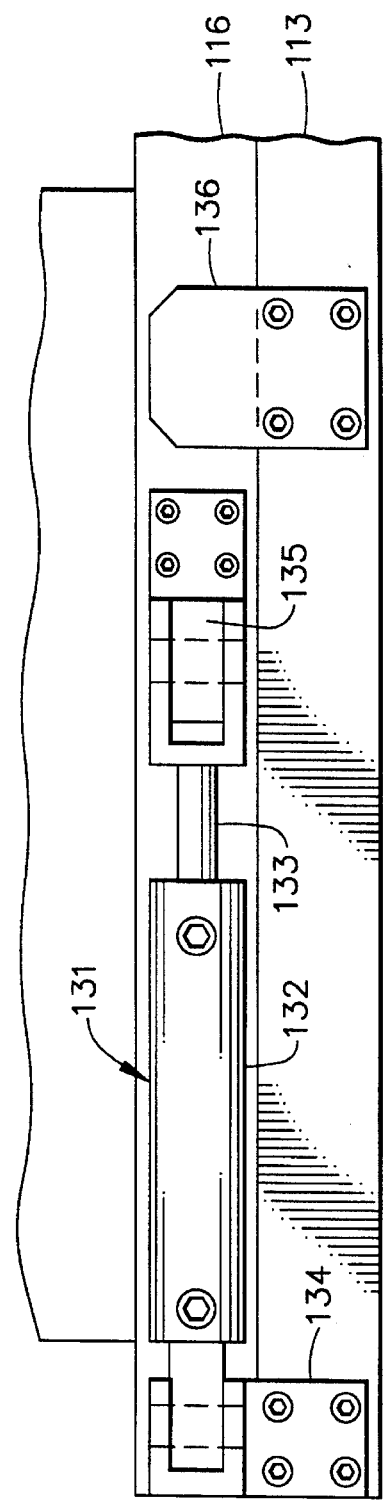
FIG. 5
FIG. 6

CO-INJECTION MACHINE

BACKGROUND OF THE INVENTION

1. Field of the Invention

The present invention relates to injection apparatus for softening plastics materials so that they can be injected through a manifold, into a mold, to provide a part of predetermined cross-sectional configuration. More particularly, the present invention relates to injection apparatus in which two injection units are provided, each injection unit feeding material into a single manifold for co-injection of plastics materials from two separate sources, wherein the injection units are supported in a common plane to feed a common manifold, and the longitudinal axes of the respective injection units are disposed at an acute angle relative to each other. The common manifold, in turn, feeds material into an injection mold.

2. Description of Related Prior Art

U.S. Pat. No. 5,076,777, issued Dec. 31, 1991, to W. T. Schmitt, discloses a pair of extruders for feeding a single extrusion die, configured to produce a particular cross-sectional shape. The extruders converge on the extrusion die, and the extruder axes lie in a common vertical plane.

U.S. Pat. No. 3,797,808, issued Mar. 19, 1974, to C. Y. Ma et al, discloses structure and control of an injection molding machine.

U.S. Pat. No. 4,701,292, issued Oct. 20, 1987, to E. I. Valyi, discloses a method and device for injection molding of two resins.

U.S. Pat. No. 4,657,496, issued Apr. 14, 1987, to H. Ozeki et al, discloses a hot runner mold for injection molding of two resins.

U.S. Pat. No. 4,931,234, issued Jun. 5, 1990, to R. D. Schad et al, discloses a manifold for co-injection of resins from two sources.

U.S. Pat. No. 4,808,101, issued Feb. 28, 1989, to R. D. Schad et al, discloses a manifold for tri-injection of resins from three sources.

In the course of operating extruders and injection units, it is at times necessary to remove the plastication screws, either to permit repair of the original screws, or to permit substitution of different screws. The plural units of prior art co-injection molding machines and co-extruders are not readily retracted from the common manifold.

The inventors herein have determined that it would be of great advantage in a co-injection machine to be able quickly and automatically accomplish the following:

(a) disconnection of the manifold injection nozzle from a mold element, and (b) disconnection of the injection unit nozzles from the common manifold. If these goals are accomplished, the manifold nozzle may be purged without directing purging material through the mold element and, optionally, each injector unit nozzle may be separately purged without directing purging material through the manifold. Further, the manifold may be more readily adapted to mold assemblies.

The inventors herein have also determined that it would be of great convenience in a co-injection machine to be able to selectively and independently move the injection units transversely of their respective longitudinal axes, for servicing the units.

SUMMARY OF THE INVENTION

It is, therefore, a broad object of the present invention to overcome certain problems and limitations that are inherent in the prior art structures, and to facilitate improved operation of a co-injection molding machine.

It is a further object of the present invention to provide an improved co-injection system for more convenient servicing and operation of each of the injection unit nozzles and the manifold nozzle.

One aspect of the invention is shown embodied in an injection apparatus provided for co-injection of a plurality of separate plastics materials through a single manifold. The apparatus comprises:

(a) a machine base including a mold element support;

(b) a co-injection manifold having first and second injection site means for receiving plasticated material and manifold nozzle means for discharging plasticated material;

(c) a first injection unit, including a first injection nozzle;

(d) a second injection unit, including a second injection nozzle;

(e) means for biasing the first and second injection nozzles into respective first and second injection site means; and (f) means for simultaneously moving the co-injection manifold and the first and second injection units, in unison, with respect to the mold element support.

In a further aspect of the invention, the biasing means includes means for independently moving the first and second injection unit nozzles out of contact with the first and second injection sites.

In still another aspect of the invention, each of the first and second injection units has a longitudinal axis, along which the unit may be moved relative to the co-injection manifold, and the axes of the respective first and second injection units form an acute angle therebetween, and lie in a common plane; further, pivot means is provided for swiveling the injection units relative to one another and to the manifold. Actuators are provided for pivoting each injection unit about its pivot axis, between an operating position, in which the respective injection unit is oriented to permit it to feed plasticated material to the common manifold, and a service position, in which the injection unit is pivoted so that its forward end is moved away from the longitudinal axis of the other injection unit, and away from the manifold, to permit convenient access for servicing the screw and other components.

BRIEF DESCRIPTION OF THE DRAWINGS

FIG. 5 is an elevational section, taken along the line 5—5 of FIG. 2.

FIG. 6 is an elevational view, taken along the line 6—6 of FIG. 4.

DESCRIPTION OF THE PREFERRED EMBODIMENT

The drawings herein have been simplified to illustrate the principles of the invention, i.e., certain details of construction (valves, switches, piping, wiring, fasteners, etc.) have been omitted for purposes of clarity; such details are deemed to be well within the knowledge of a machine design engineer concerned with the art pertaining to injection machines.

Figure 1:
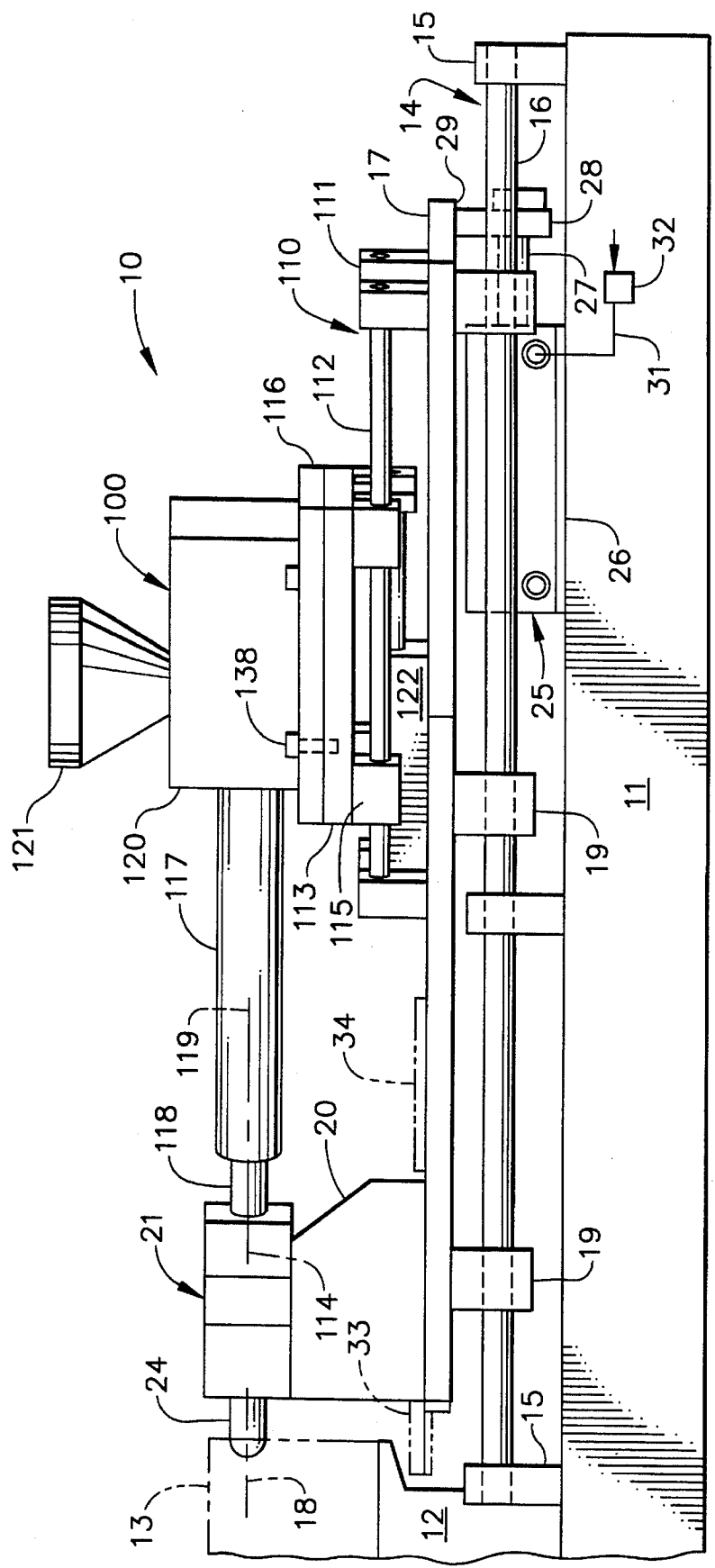
FIG. 1 is a side elevational view of an injection molding machine, supporting a mold element, the machine having a co-injection manifold mounted on a base slide, and having a pair of injection units carried in tandem with the manifold, on the base slide for movement with respect to the mold element.
Figure 2:
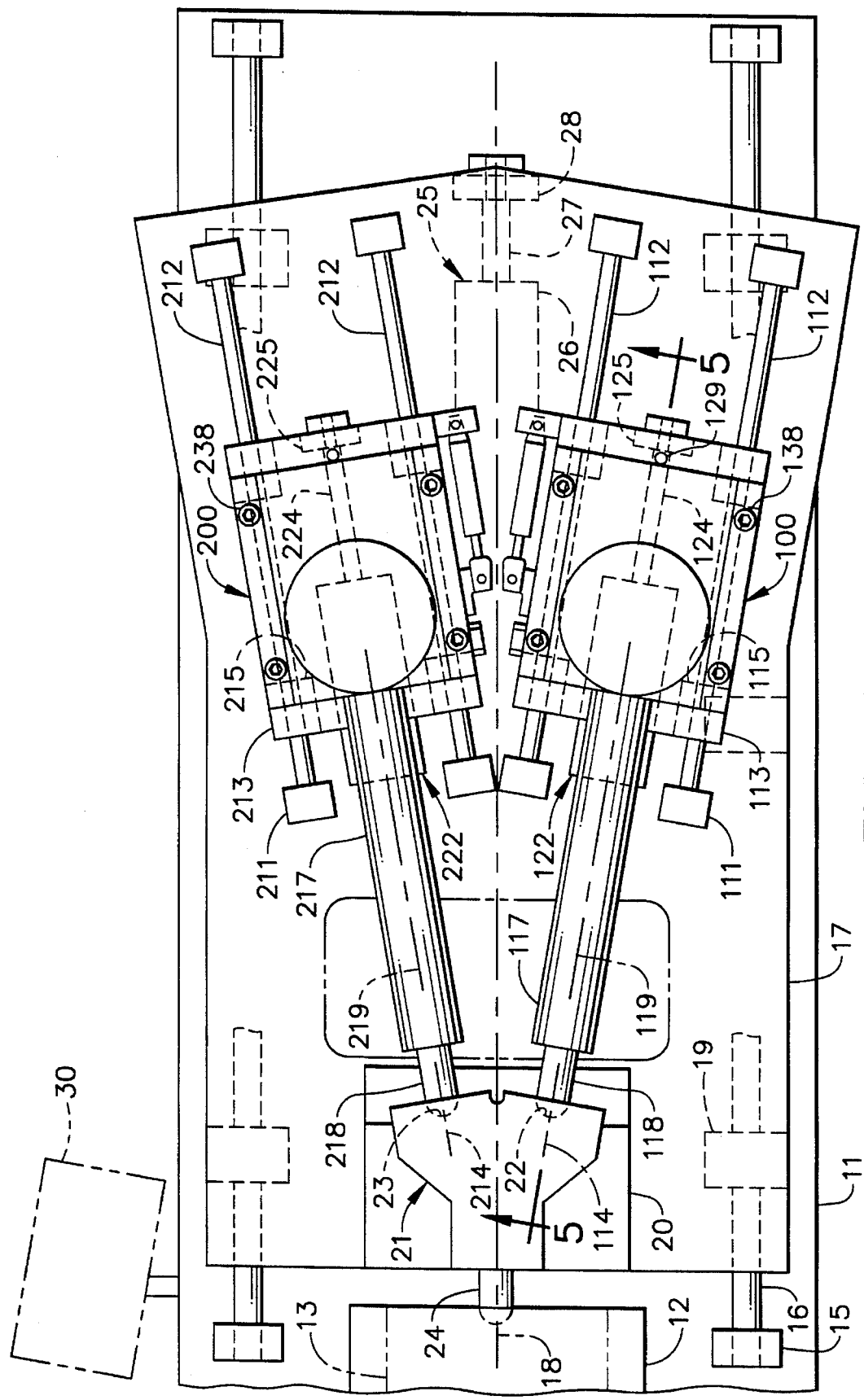
FIG. 2 is a top plan view of the injection molding machine of FIG. 1.

Referring now the drawings, in particularly to FIGS. 1 and 2 thereof, there is shown a co-injection molding machine 10, including a base 11, having a mold element support 12; the mold element support, in turn, carries a mold element 13 which comprises part of a complete mold assembly (not shown) for forming injection molded parts. Such mold assembly, and its opening and closing structures, are well-known in the art, and would extend to the left of FIG. 1.

The machine base 11 further comprises a base slide support 14 which is shown as having stationary stand-offs 15 affixed to guide rails 16. A base slide 17 is mounted to the base slide support 14 for sliding movement parallel to a base slide axis 18. The base slide 17 includes a plurality of bearings 19 slidably received with the guide rails 16. The bearings 19 and rails 16 may comprise any of a variety of well-known linear guideways, for example, anti-friction guideways manufactured by NSK Corporation, Ann Arbor, Mich. The left end of the base slide 17 is its forward end, where a riser block 20 supports a co-injection manifold 21.

The co-injection manifold 21 may comprise a variety of manifolds, having at least first and second injection sites 22, 23 for receiving plasticated material, and a manifold nozzle 24 for discharging plasticated material.

The co-injection manifold 21 depicted is a commercial unit, purchased from Bemis Manufacturing Company, Sheboygan Falls, Wisc., and comprises a mechanism capable of receiving plasticized material from two injection sites 22,23, and managing the flow of material within the manifold to the manifold outlet nozzle 24. The manifold 21 has an internal pin (not shown) for directing flow of material; the pin is hydraulically moved and provides feedback for proper control thereof. By way of analogy, the manifold 21 may be compared to a three-way fluid control valve, wherein a central pin or spool may be hydraulically moved to direct flow from one or two inlet ports to a single outlet port. The phrase "co-injection" generally refers to those manifolds which deliver the materials from several sources, where the streams of materials may mix through a common manifold nozzle 24.

It should be noted that "dual-path injection" may also be performed on the machine 10, by using a manifold having two manifold nozzles (not shown), i.e., the streams of material are not mixed at, or in, the manifold.

The base 11 supports a base slide actuator 25, which comprises a hydraulic cylinder 26 affixed to the base 11, having a relatively movable piston rod 27 which is affixed to a bracket 28 attached to the lower rear surface 29 of the base slide 17. The actuator 25 serves as a means for selectively and automatically moving the co-injection manifold 21 and base slide 17, with respect to the mold element support 12, parallel to the base slide axis 18, between a co-injecting position (shown in FIGS. 1 and 2), proximal to the mold element support 12, and a manifold purging position (see FIG. 3), distal the mold element support by a retraction distance "A". The base slide axis 18 is, for purposes of convenience, defined as an axis passing through the manifold nozzle 24.

First and second injection units 100,200 are mounted to the base slide 17, in tandem with the manifold 21, for movement in unison relative to the mold element support 12. The first and second injection units 100,200 are, for all purposes, substantially identical to one another, and may comprise a variety of injection units known in the injection molding machine arts. Such injection units are supported and operated by identical elements, which will, therefore, be described in connection with only the first injection unit 100, with corresponding reference numbers differing only by the respective prefixes, "1" and "2".

The base slide 17 further includes a first unit slide support 110, which comprises stationary stand-offs 111 affixed to guide rails 112. A first unit slide 113 is mounted to the first unit slide support 110 for sliding movement parallel to a first injection axis 114. The first injection axis 114 extends through the first injection site 22 of the manifold 21. The first unit slide 113 includes a plurality of bearings 115 slidably received with the guide rails 112. The bearings 115 and rails 112 may comprise any of a variety of well-known linear guideways, for example, antifriction guideways manufactured by NSK Corporation, Ann Arbor, Mich.

The first injection unit 110 is mounted by means of a subplate 116 which is secured to the first injection unit slide 113 by clamping means 138; the clamping means 138 may comprise hold-down bolts or an automatically applied and released latch.

An exemplary injection unit, suitable for use as the first and second injection units 100,200 herein, is taught in U.S. Pat. No. 3,797,808; the teachings of this patent are expressly incorporated herein by reference.

The first injection unit 100 incorporates a tubular barrel 117 and first injection nozzle 118 that have a longitudinal axis 119 extending in a substantially horizontal direction, coincident with the first injection axis 114, in FIGS. 1 and 2. The barrel 117 includes an inner, rotatable plastication screw (not shown) and a plurality of outer, resistance-type heater bands (not shown) to apply heat to the exterior of the barrel 117. The heater bands aid in softening the plastic material while the material is mechanically worked by the plastication screw and as the material is being conveyed within the barrel 117 in a direction toward the first injection nozzle 118 located at the end of the barrel 117. The main body enclosure 120 of the injection unit 100 comprises a drive gear system enclosure which, in turn, is connected to a screw drive motor (not shown). A feed hopper 121 is located at the top of the enclosure 120, for delivering pelletized or powdered plastic material into the barrel 117.

The first injection unit support 110 is arranged on the base slide 17 so that the longitudinal axis 119 of the first injection unit 100 forms an acute angle with the base slide axis 18, as shown in the plan view of FIG. 2. Likewise, the longitudinal axis 219 of the second injection unit 200 is arranged to form an acute angle with the base slide axis 18, and the two longitudinal axes 119,219 form an acute angle therebetween, converging towards the manifold 21. In the elevational view of FIG. 1, the first and second longitudinal axes 119,219 are arrayed parallel to the base slide axis 18.

Referring now to FIGS. 2 and 5, a first unit actuator 122, comprised of a hydraulic cylinder 123 affixed to the top surface of the base slide 17, between the linear guide rails 112, has a relatively movable piston rod 124 which is affixed to a bracket attached to the lower rear surface 125 of the first injection unit slide 113. The first unit actuator 122 serves as a means for selectively and automatically moving the first injection unit 100 with respect to the co-injection manifold 21, parallel to the first longitudinal axis 119, between a first injecting position (shown in FIGS. 1 and 2), where the first injection nozzle 118 is received in fluid communication with the first injection site 22, and a first purging position (see FIG. 4) where the first injection nozzle 118 is separated from the first injection site 22 by a retraction distance "B".

In similar fashion, the second injection nozzle 218 may be moved through a retraction distance "C", which need not be identical to distance "B".

A computer control 30 is used for controlling the machine cycle and relative movements of the base slide 17 and injection units 100,200 described above. The control 30 is available under the trademark CAMAC 486 PLUS, designed for injection molding machines, available from Cincinnati Milacron Inc., Cincinnati, Ohio. This control 30 is suitable for managing the processing parameters associated with plural injection units 100,200, and for managing machine movements.

In the operating position shown in FIGS. 1 and 2, the base actuator 25 is provided with sufficient pressure for biasing the manifold nozzle 24 into intimate contact with the mold element 13, and holding the manifold nozzle 24 in position while plasticated material is forced into the mold. The pressure line 31 for biasing the nozzle 24 into engagement with the mold element 13 is monitored by an automatic means 32 comprising, for example, a pressure switch capable of outputting a signal, should the pressure exceed a predetermined limit; the signal may be used to indicate that a separation between the manifold nozzle 24 and mold element 13 has occurred. Similarly, the first unit actuator 122 is provided with sufficient pressure for biasing the first injection nozzle 118 into intimate contact with the first injection site 22, of the manifold 21, and holding the first injection nozzle 118 in position while plasticated material is forced into the manifold 21. The pressure line 127 for biasing the nozzle 118 into engagement with the manifold 21 is monitored by an automatic means 128 comprising, for example, a pressure switch capable of outputting a signal should the pressure exceed a predetermined limit; the signal may be used to indicate that a separation between the first injection nozzle 118 and first injection site 22 has occurred.

Figure 3:
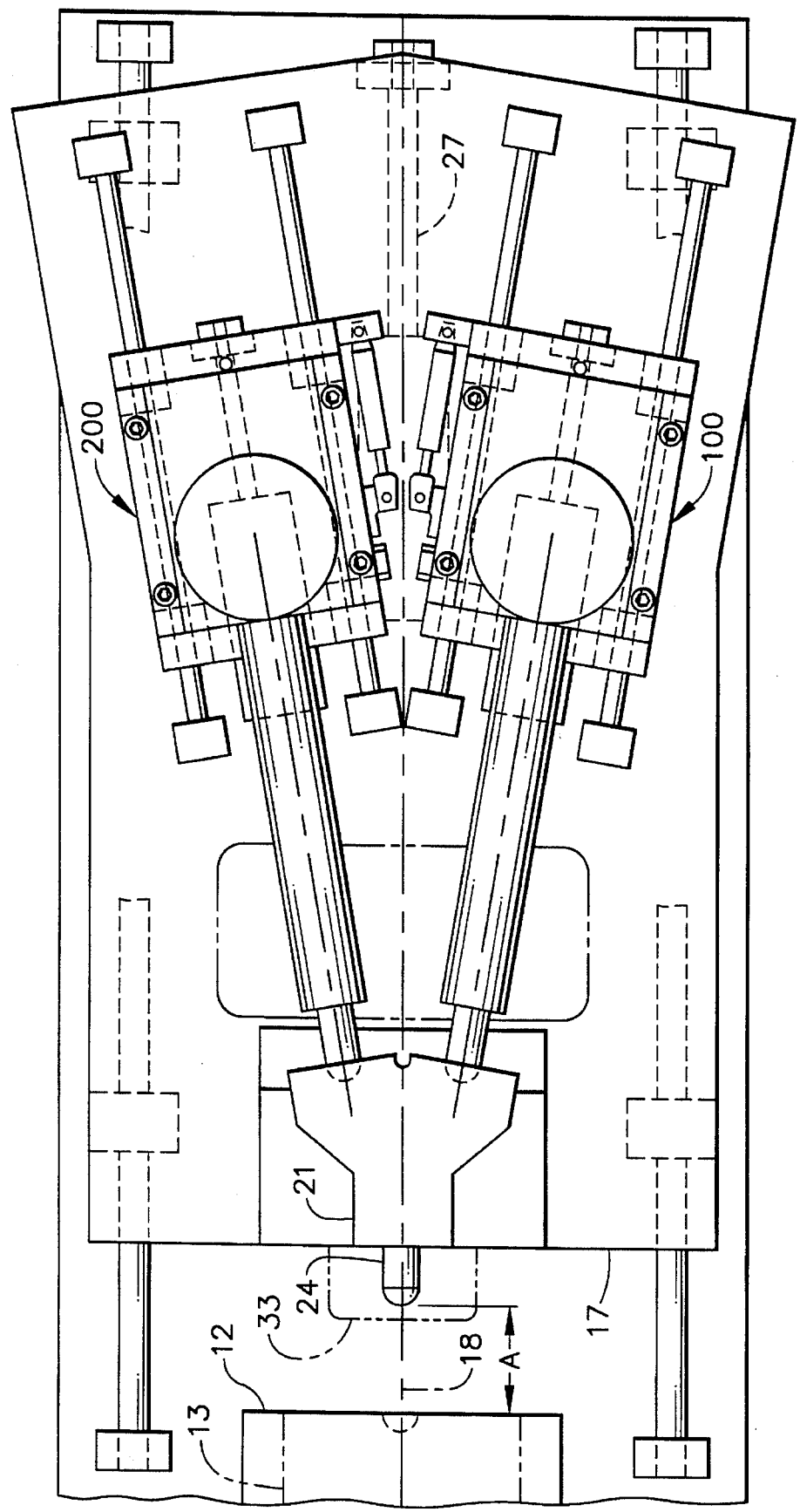
FIG. 3 is top plan view of the injection molding machine, showing the manifold and injection units retracted from the mold element.

In the retracted position of FIG. 3, the manifold nozzle 24 may be purged of unwanted plasticated material without directing the unwanted material through the mold element 13. At such time, the material may be collected on a tray 33 located at the forward end of the base slide 17. In similar manner, when retracted to the positions shown in FIG. 4, the injection nozzles 118,218 may be purged of unwanted plasticated material without directing the material through the manifold 21. At such time, the unwanted material may be collected in a tray 34 provided on the base slide 17 beneath the injection nozzles 118,218.

Figure 4:
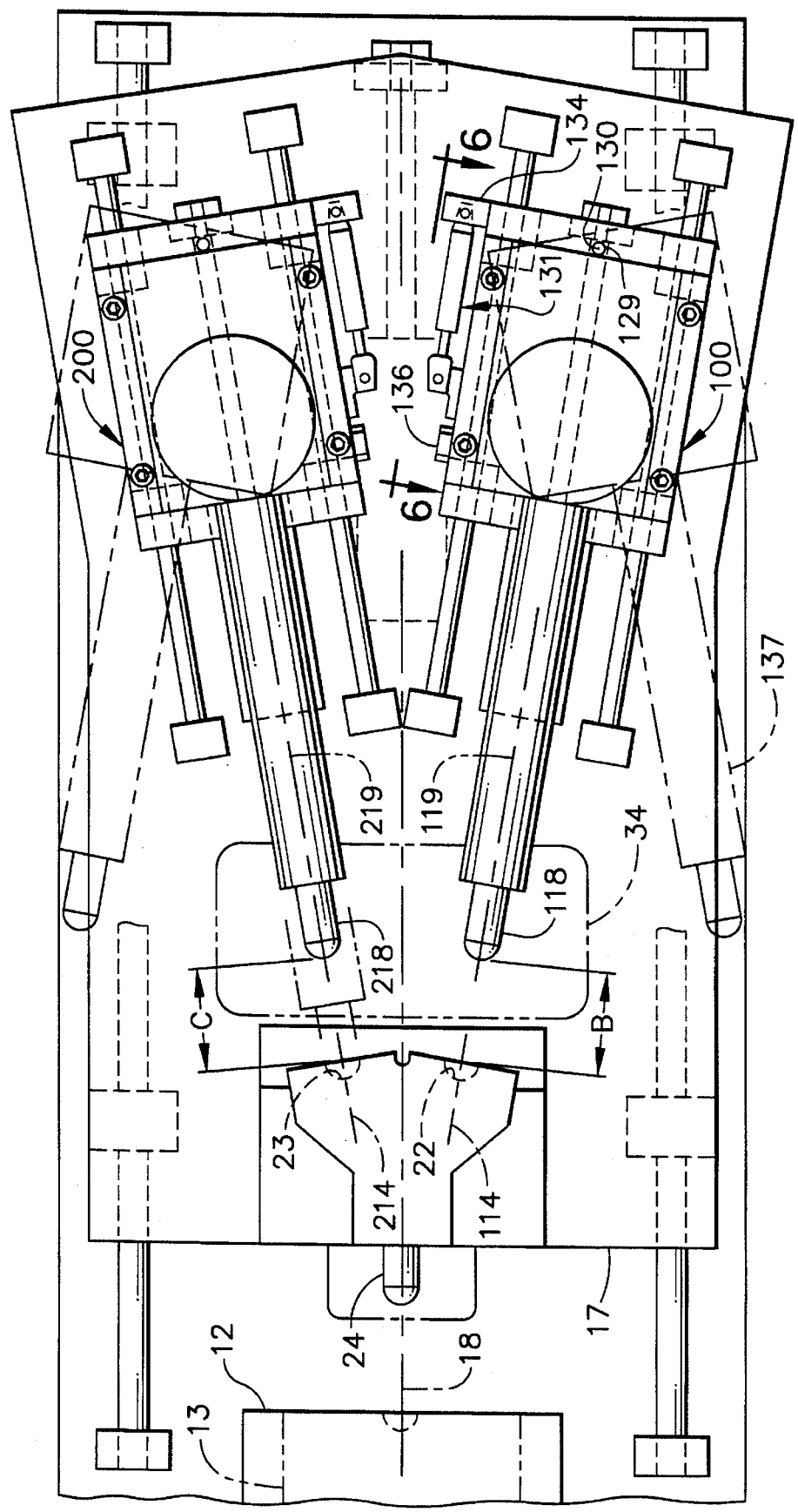
FIG. 4 is a top plan view of the injection molding machine, showing the injection units retracted from the manifold.

FIG. 6 shows structure for pivoting the first injection unit 100. With reference also to FIGS. 4 and 5, the first injection unit subplate 116 is pivotally mounted to the first injection unit slide 113 by means of a vertical pivot pin 129, having a vertical axis 130 intersecting the longitudinal axis 119 of the barrel 117. The pivot pin 129 is located near the rear end of the first injection unit 100 such that the entire injection unit may be pivoted away from the base slide axis 18 and the second injection unit 200, for ease of service of the first injection unit 100. In this manner, therefore, the longitudinal axis 119 of the first injection unit 100 is moved out of alignment with the first injection axis 114, and the first injection nozzle 118 is moved away from the manifold 21. In some instances, the first injection unit 100 may be pivoted manually, but in the preferred embodiment, a pivot actuator 131 is employed for automatic power movement. The pivot actuator 131 comprises a hydraulic cylinder 132 and relatively movable piston rod 133, wherein one end of the cylinder is pivotally mounted to a clevis bracket 134 affixed to the side of the first injection unit slide 113, while the end of the rod 133 is pivotally mounted to a clevis bracket 135 affixed to the corresponding side of the first injection unit subplate 116. Normally, the piston rod 133 is retracted into the cylinder 132, maintaining the alignment of the longitudinal axis 119 with the first injection axis 114, and the injection unit subplate 116 is held against a stop block 136 mounted to the first injection unit slide 113. When it is desired to pivot the first injection nozzle 118 away from the manifold 21, the first injection unit 100 is retracted by the amount "B", the clamping means 138 is released, and the clevis-mounted cylinder 132 is actuated to extend the piston rod 133, thereby effecting pivotal movement of the first injection unit 100 and subplate 116 about the pivot axis 130, to the phantom position 137.

In the preferred embodiment, the base axis 18 is substantially horizontal in the elevational view of FIG. 1. Likewise, the first and second injection axes 114,214 are, preferably, arranged to approach the manifold 21 in a horizontal plane. However, it will be appreciated by those skilled in the art, that these axes may be arranged in a variety of attitudes without departing from the scope of the invention. And, although the terms "injection unit", "injection nozzle", etc. have been used throughout in connection with the preferred embodiment, those skilled in the injection and extruder arts will realize that the arrangement and cooperation of the base slide 17 and injection unit slides 113,213 will find use in extruder machines, as well; i.e., the words "injection" and "co-injection" are meant to apply to extruders and co-extruders. Further, the apparatus is meant to cover dual-path injection, as well as co-injection.

Therefore, while the invention has been shown in connection with a preferred embodiment, it is not intended that the invention be so limited; rather, the invention extends to all such designs and modifications as come within the scope of the appended claims.

What is claimed is:

1. An injection apparatus for injecting separate and distinct streams of plasticated material that are introduced into an injection mold to provide an injected product, said apparatus comprising:

(a) a machine base including a mold element support;

(b) an injection manifold having first and second injection site means for receiving plasticated material and manifold nozzle means for discharging plasticated material, said nozzle means including at least one manifold nozzle;

(c) a first injection unit, including a first injection nozzle;

(d) a second injection unit, including a second injection nozzle;

(e) means for biasing said first and second injection nozzles into respective first and second injection site means; and (f) means for simultaneously moving said injection manifold and said first and second injection units, in unison, with respect to said mold element support.

2. An injection apparatus according to claim 1, further comprising: means for selectively pivoting said first and second injection units with respect to said manifold.

3. An injection apparatus according to claim 1, wherein said manifold and said first and second injection units move parallel to a common plane.

4. An injection apparatus according to claim 3, wherein said common plane is substantially horizontal.

5. An injection apparatus for injecting separate and distinct streams of plasticated material that are introduced into an injection mold to provide an injected product, said apparatus comprising:
   (a) a machine base including a base slide support and a mold element support;
   (b) a base slide, mounted to said base slide support, for movement along a base slide axis, said base slide including first and second injection unit supports;
   (c) an injection manifold mounted to said base slide, said injection manifold including first and second injection site means for receiving plasticated material, and manifold nozzle means for discharging plasticated material;
   (d) base slide means for selectively and automatically moving said injection manifold and base slide, with respect to said mold element support, along said base slide axis, between a manifold injecting position, proximal said mold element support, and a manifold purging position, distal said mold element support;
   (e) a first injection unit, mounted to said first injection unit support, for movement along a first axis, said first injection unit including a first injection nozzle;
   (f) a second injection unit mounted to said second injection unit support, for movement along a second axis, said second injection unit including a second injection nozzle, said first and second axes forming an angle therebetween and lying in a common plane;
   (g) first means for selectively and automatically moving said first injection unit with respect to said injection manifold, along said first axis, between a first injecting position where said first injection nozzle is received in fluid communication with said first injection site, and a first purging position where said first injection nozzle is separated from said first injection site;
   (h) second means for selectively and automatically moving said second injection unit with respect to said injection manifold, along said second axis, between a second injecting position where said second injection nozzle is received in fluid communication with said second injection site, and a second purging position where said second injection nozzle is separated from said second injection site; and
   (i) computer means for controlling said base slide means, said first means, and said second means.

6. An injection apparatus according to claim 5, further comprising: means for selectively moving said first and second injection units transversely of said first and second axes.

7. An injection apparatus according to claim 5, further comprising: means for selectively pivoting said first and second injection units with respect to said base axis.

8. An injection apparatus according to claim 5, wherein said base slide axis is substantially horizontal.

9. An injection apparatus according to claim 8, wherein said common plane is substantially horizontal.

10. An injection apparatus for injecting separate and distinct streams of plasticated material that are separately introduced into an injection mold to provide an injected product, said apparatus comprising:
   (a) a machine base including a base slide support and a mold element support;
   (b) a base slide, mounted to said base slide support, for movement along a base slide axis, said base slide including first and second injection unit supports;
   (c) an injection manifold mounted to said base slide, said injection manifold including first and second injection sites for receiving a predetermined quantity of plasticated material, and at least one manifold nozzle for discharging said predetermined quantity of plasticated material;
   (d) base slide means for selectively and automatically moving said injection manifold and base slide, with respect to said mold element support, along said base slide axis, between a manifold injecting position, proximal said mold element support, and a manifold purging position, retracted from said mold element support, and for providing a manifold biasing force for holding said manifold in said injecting position;
   (e) a first injection unit, mounted to said first injection unit support, for movement along a first axis, said first injection unit including a first injection nozzle and means for purging said first injection nozzle with a first portion of plasticated material;
   (f) a second injection unit mounted to said second injection unit support, for movement along a second axis, said second injection unit including a second injection nozzle and means for purging said second injection nozzle with a second portion of plasticated material, said first and second axes forming an angle therebetween and lying in a common plane;
   (g) first means for selectively and automatically moving said first injection unit with respect to said injection manifold, along said first axis, between a first injecting position where said first injection nozzle is received in fluid communication with said first injection site, and a first purging position where said first injection nozzle is separated from said first injection site, and for providing a first nozzle biasing force for holding said first injection unit in said first injecting position;
   h) second means for selectively and automatically moving said second injection unit with respect to said injection manifold, along said second axis, between a second injecting position where said second injection nozzle is received in fluid communication with said second injection site, and a second purging position where said second injection nozzle is separated from said second injection site, and for providing a second nozzle biasing force for holding said second injection unit in said second injecting position;
   (i) means for monitoring said manifold nozzle biasing force;
   (j) means for monitoring said first nozzle biasing force;
   (k) means for monitoring said second nozzle biasing force; and
   (l) computer means for controlling said base slide means, said first means, and said second means.

11. An injection apparatus according to claim 10, wherein said common plane is substantially horizontal.

12. An injection apparatus according to claim 10, further comprising: means for selectively adjusting said angle formed between said first and second axes.

13. An injection apparatus according to claim 10, further comprising: means for selectively pivoting either of said first and second axes with respect to said base slide axis and thereby adjusting said angle formed between said first and second axes.

14. A method for operating an apparatus for injecting separate and distinct streams of plasticated material into an injection mold to provide an injected product, comprising the following steps:

(a) providing a machine base including a mold element support;

(b) providing a injection manifold having first and second injection site means for receiving plasticated material and manifold nozzle means, including at least one manifold nozzle, for discharging plasticated material;

(c) providing a first injection unit, including a first injection nozzle;

(d) providing a second injection unit, including a second injection nozzle;

(e) biasing said first and second injection nozzles into respective first and second injection site means; and (f) simultaneously moving said injection manifold and said first and second injection units, in unison, with respect to said mold element support.

15. A method for operating an apparatus according to claim 14, further comprising the following step:

(g) independently moving said first and second injection unit nozzles out of contact with said first and second injection sites.

16. A method for operating an apparatus according to claim 14, further comprising the following step:

(g) pivoting said first and second injection units relative to said manifold.

17. A method for operating an apparatus for injecting separate and distinct streams of plasticated material into an injection mold to provide a injected product, comprising the following steps:

(a) providing a machine base having a base slide support and a mold element support;

(b) mounting a mold element to said mold element support;

(c) mounting a base slide to said base slide support, for movement along a base slide axis, said base slide including first and second injection unit supports;

(d) mounting an injection manifold to said base slide, said injection manifold including first and second injection sites for receiving plasticated material, and a manifold nozzle for discharging plasticated material;

(e) selectively and automatically moving said injection manifold and base slide, with respect to said mold element, along said base slide axis, between a manifold injecting position, proximal said mold element, and a manifold purging position, distal said mold element;

(f) mounting a first injection unit to said first injection unit support, for movement along a first axis, said first injection unit including a first injection nozzle;

(g) mounting a second injection unit to said second injection unit support, for movement along a second axis, said second injection unit including a second injection nozzle;

(h) arranging said first and second axes in a common plane;

(i) selectively and automatically moving said first injection unit with respect to said injection manifold, along said first axis, between a first injecting position where said first injection nozzle is received in fluid communication with said first injection site, and a first purging position where said first injection nozzle is separated from said first injection site; and (j) selectively and automatically moving said second injection unit with respect to said injection manifold, along said second axis, between a second injecting position where said second injection nozzle is received in fluid communication with said second injection site, and a second purging position where said second injection nozzle is separated from said second injection site.

18. An operating method according to claim 17, further comprising the following step:

(k) purging either of said first and second injection nozzles of a respective portion of plasticated material without directing said respective portion through said manifold.

19. An operating method according to claim 17, further comprising the following step:

(k) purging said manifold nozzle of said predetermined quantity of plasticated material while distal said mold element.

20. An operating method according to claim 17, further comprising the following step:

(k) selectively adjusting said angle formed between said first and second axes.

21. An operating method according to claim 17, further comprising the following step:

(k) selectively pivoting either of said first and second axes with respect to said base slide axis and thereby adjusting said angle formed between said first and second axes.

22. A method for operating an apparatus according to claim 17, further comprising the following step:

(k) arranging said first and second axes in a substantially horizontal plane.

23. A method for operating an apparatus according to claim 17, further comprising the following steps:

(k) selectively injecting a first predetermined quantity of plasticated material from at least one of said first and second injection nozzles into said manifold;

(l) discharging said first predetermined quantity of plasticated material from said manifold nozzle;

(m) periodically purging the other of said first and second injection nozzles of a respective portion of plasticated material without directing said respective portion through said manifold; and (n) periodically purging said manifold nozzle of at least a waste amount of said predetermined quantity of plasticated material while distal said mold element.

24. An operating method according to claim 23, further comprising the following step:

(o) selectively adjusting said angle formed between said first and second axes.

25. An operating method according to claim 23, further comprising the following step:

(o) selectively pivoting either of said first and second axes with respect to said base axis and thereby adjusting said angle formed between said first and second axes.

26. A method for operating an apparatus according to claim 17, further comprising the following steps:

(k) providing a manifold nozzle biasing force for holding said manifold in said manifold injecting position;

(l) providing a first nozzle biasing force for holding said first injection unit in said first injecting position;

(m) providing a second nozzle biasing force for holding said second injection unit in said second injecting position;

(n) monitoring said manifold nozzle biasing force;

(o) monitoring said first nozzle biasing force; and (p) monitoring said second nozzle biasing force.

27. A method for operating an apparatus according to claim 26, further comprising the following steps:

(q) selectively injecting a first predetermined quantity of plasticated material from at least one of said first and second injection nozzles into said manifold;

(r) discharging said first predetermined quantity of plasticated material from said manifold nozzle;

(s) periodically purging the other of said first and second injection nozzles of a respective portion plasticated material without directing said respective portion through said manifold; and (t) periodically purging said manifold nozzle of at least an amount of said predetermined quantity of plasticated material while distal said mold element.

28. An operating method according to claim 26, further comprising the following step:

(q) selectively adjusting said angle formed between said first and second axes.

29. An operating method according to claim 26, further comprising the following step:

(g) selectively pivoting either of said first and second axes with respect to said base axis and thereby adjusting said angle formed between said first and second axes.

* * * * *